Sept. 8, 1970  T. D. NEWTON  3,528,082
MACHINE TOOL FEED CONTROL

Filed Feb. 29, 1968  3 Sheets-Sheet 1

INVENTOR.
THOMAS D. NEWTON
BY
Robert R. Thornton
ATTORNEY

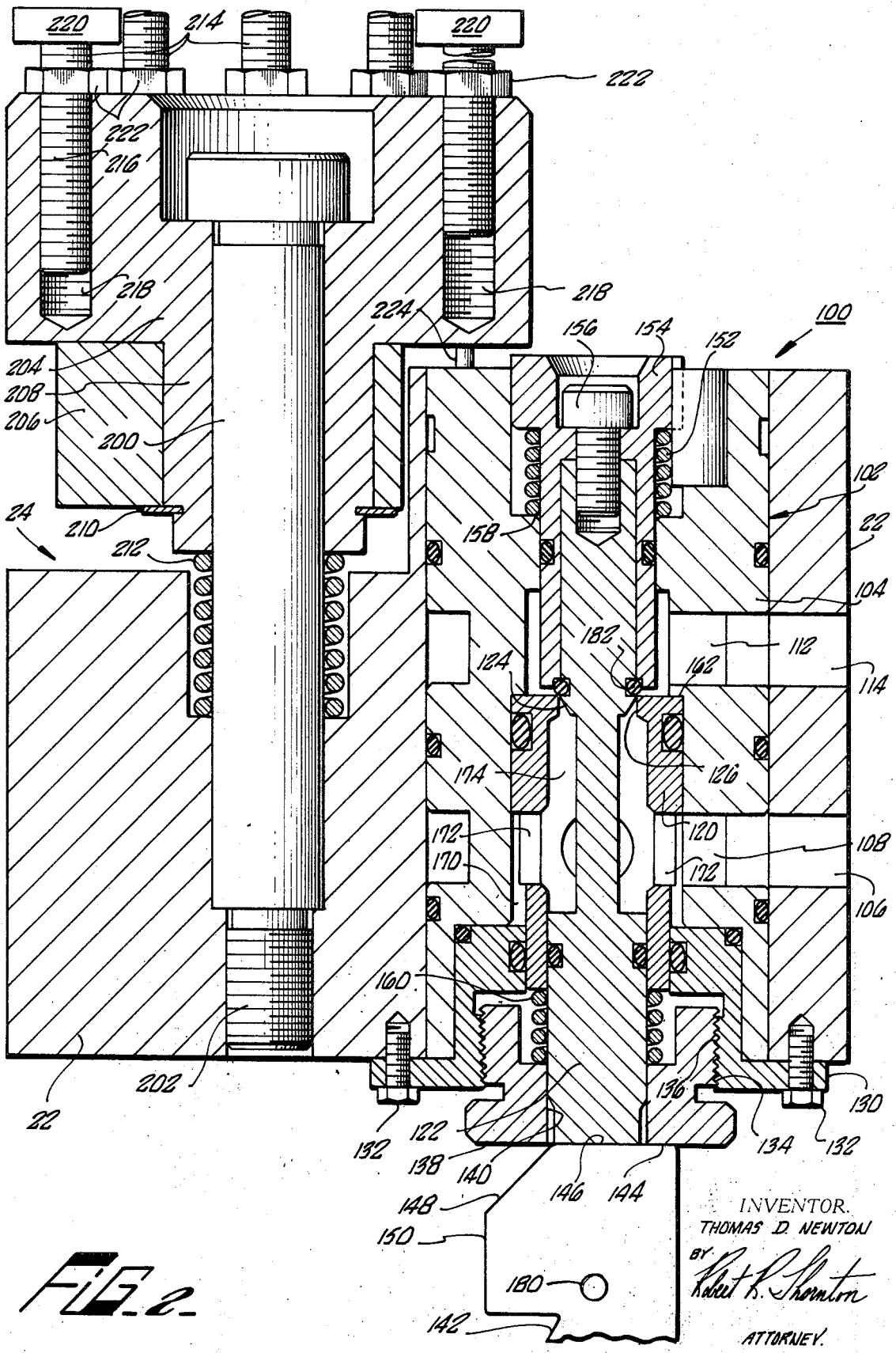

Sept. 8, 1970     T. D. NEWTON     3,528,082
MACHINE TOOL FEED CONTROL
Filed Feb. 29, 1968     3 Sheets-Sheet 3
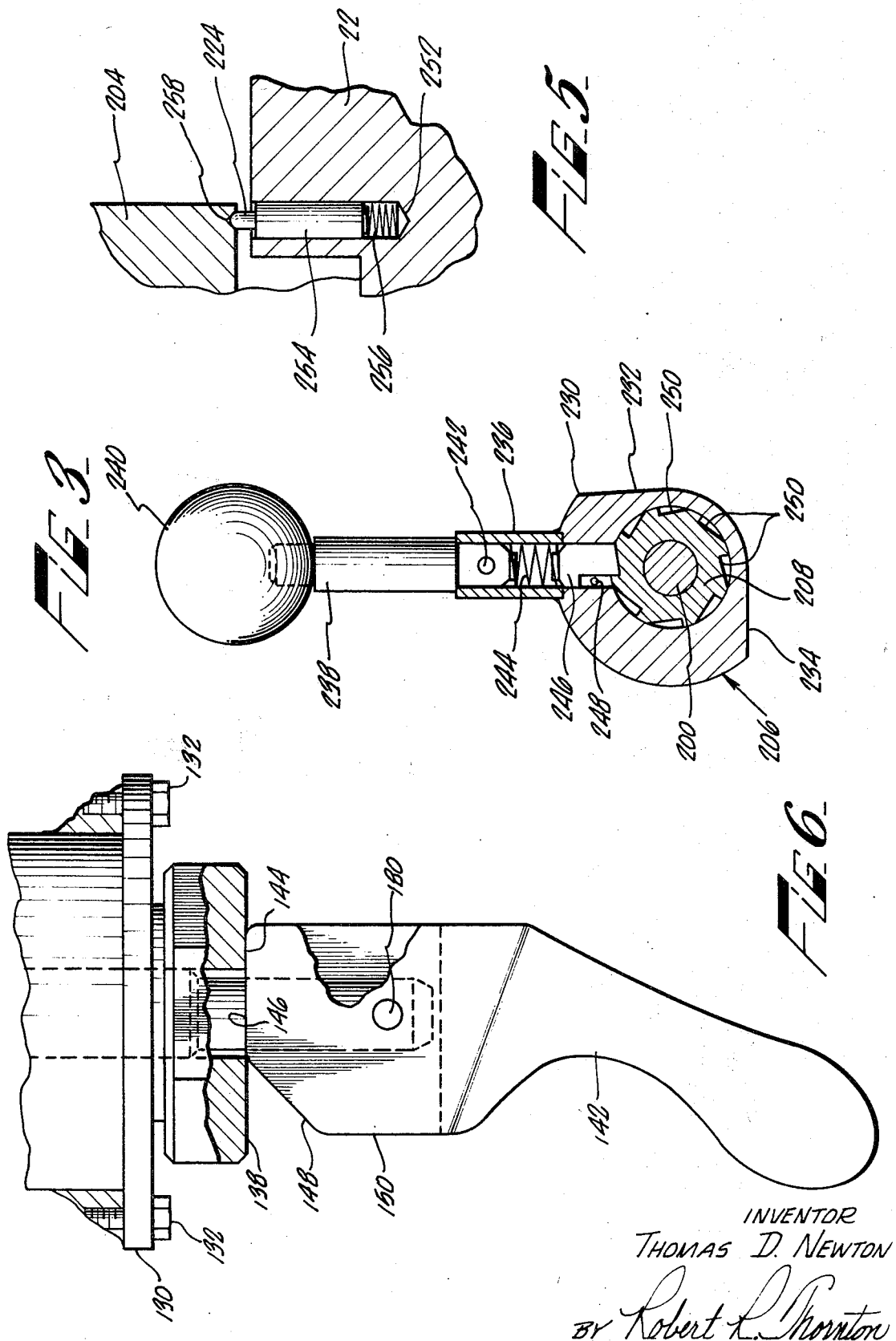
INVENTOR
THOMAS D. NEWTON
BY Robert L. Thornton
ATTORNEY

United States Patent Office 3,528,082
Patented Sept. 8, 1970

3,528,082
MACHINE TOOL FEED CONTROL
Thomas D. Newton, Downey, Calif., assignor to Allied Pacific Manufacturing Company, Compton, Calif., a corporation of California
Filed Feb. 29, 1968, Ser. No. 709,472
Int. Cl. B23c 9/00
U.S. Cl. 90—21.5                                    2 Claims

ABSTRACT OF THE DISCLOSURE

A valve assembly for controlling hydraulic fluid flow to hydraulic cylinders in pattern-following machine tools. A control valve and a turret stop assembly are mounted on a compound slide assembly. The control valve is manually opened to initiate movement of the pattern-following tool by hydraulic fluid flow through the valve. Adjustment of the amount of valve opening controls movement rate. Turret stop assembly movement, in response to contact with a stop on the fixed base of the slide assembly, shuts off the control valve.

---

Various type of machine tools utilize a master pattern, the outline of which is traced by a stylus or the like to reproduce the pattern outline, or a function of the pattern outline, on a work piece by cutting, tracing, or the like. More particularly, such pattern-following machine tools have found widespread use in machine tool tables, machine tool carriages, tracer slides, and similar devices where the pattern outline is utilized to control hydraulically powered moving members in order to reproduce the pattern on a work piece. Conventional devices of this type have lacked a certain flexibility in that the rate of movement of the hydraulically powered member could not be readily controlled over a wide range. Also, such devices have not provided a mechanism by which the maximum amount of movement, for a given tracing, could be limited. Such movement limitation is particularly advantageous when utilized in conjunction with a lathe or the like, where repeated passes of a cutting tool on the work piece may be utilized to produce the desired shape on the work piece.

The present invention utilizes a control assembly which, in its primary aspect, utilizes a valve sleeve positioned in a valve body and having a valve piston and valve seat disposed within a bore extending through the valve sleeve. The valve piston and valve sleeve are relatively movable with respect to each other to open and close a valve formed thereby. Hydraulic fluid, utilized to control the movement of the hydraulically powered moving member, flows through the valve when opened to provide the necessary fluid pressure to move the hydraulically powered member. The valve piston and valve seat are normally biased apart, and a valve actuator is provided to select the degree of closure of the valve, so as to regulate hydraulic fluid flow rate and thus the rate of movement of the hydraulically powered moving member.

Additionally, an automatic valve closure mechanism, referred to hereinafter as a turret stop assembly, is mounted on the valve body. When the turret stop assembly contracts a fixed stop, it is moved against the valve assembly, initiating relative movement between the valve piston and valve seat so as to close the valve regardless of the setting of the actuator. The turret stop assembly includes a plurality of turret stops whose relative positions can be selected by an indexing lever in order to provide a series of separate, sequential limitations on the movement of the hydraulically powered member.

The invention may be more readily understood by referring to the accompanying drawings in which:

FIG. 2 is a view, in section, of the valve and turret stop assembly of the present invention;

FIG. 3 is a view, in cross-section, of the indexing lever utilized to sequentially position the individual turret stops in position for operation;

FIG. 5 is a fragmentary view, in section, of a portion of the control assembly of the present invention; and FIG. 6 is a partial sectional view illustrating the physical mounting of the feed control lever with respect to the valve and turret stop assembly.

Figure 1:
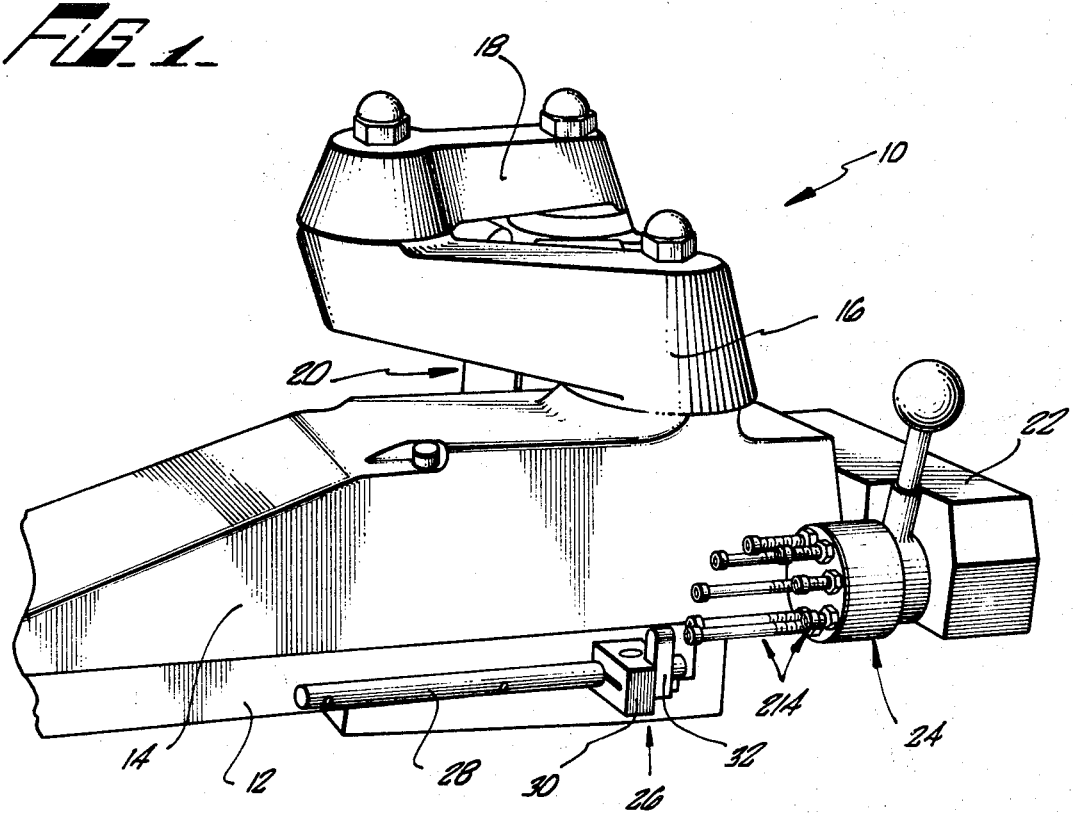
FIG. 1 is an isometric view of the control assembly of the present invention.

Referring now to FIG. 1, there is shown an assembly 10 which may be utilized to control hydraulically powered moving members, such as machine tool tables, machine tool carriages, tracer slides and the like. The assembly 10 includes a compound base assembly 12, onto which is mounted a compound slide assembly 14. A pair of relatively movable valve arms 16, 18 are connected between the compound slide assembly 14 and a tracer element 20. The present invention is illustrated in FIG. 1 as including a valve body 22, which contains a control valve (not shown, see FIG. 2) and a turret stop assembly 24. Mounted on the compound base assembly 12 is a slidable fixed stop assembly 26, which includes a slide rod 28 fixed to the compound base assembly 12, a slide stop block 30 and a rotatable stop 32. The slide stop block 30 may be fixed in position along the slide rod 28 so as to vary the location of the rotatable stop 32 with respect to the turret stop assembly 24.

FIG. 2 is a view, in section, of the valve and turret stop assembly of the present invention. In FIG. 2, a control valve 100 is shown as disposed within a main bore 102 formed in the valve body 22. The control valve 100 has a valve sleeve 104 disposed in the main bore so as to have a valve body hydraulic fluid inlet passage 106 in alignment with a valve sleeve hydraulic fluid inlet passage 108 formed in the valve sleeve 104. The valve sleeve 104 has a valve sleeve hydraulic fluid outlet passage 112 which is aligned with a valve body hydraulic fluid outlet passage 114. A valve seat assembly 120 is disposed within the valve sleeve 104. Extending through the valve seat assembly 120 is a valve piston 122, having a valve plug 124 which engage the valve seat assembly 120 at a valve orifice 126 formed therein. Thus, as shown in FIG. 2, the control valve is in the closed position, the valve proper being formed between the orifice 126 and the valve plug 124.

A feed adjustment sleeve 130 is attached to the valve body 22 by bolts 132 or the like so as to fix the sleeve to the body. The sleeve has a threaded portion 134 which engages a complementary threaded portion 136 formed on a feed adjustment knob 138. The feed adjustment knob has a central passage 140, through which the valve piston 122 extends. At the extremity of the valve piston 122, a feed control lever 142 is pivotally connected so as to engage the feed adjustment knob 138 at its face 144. The feed control lever 142 has three stop surfaces 146, 148 and 150, respectively, corresponding to valve closure, valve partially open, and valve fully open. The feed control lever stop surfaces are held against the face 144 by a valve bias spring 152 urging against a piston cap 154 attached to the valve piston 122 by a bolt 156. As is shown in FIG. 2, the valve bias spring 152 also engages a shoulder 158 on the central passage of the valve sleeve 104, thus urging the piston cap away from the feed adjustment knob 138 so as to normally urge the valve into its open position.

A valve seat bias spring 160, disposed between the feed adjustment knob 138 and the valve seat assembly 120, urges the valve seat assembly 120 against a second shoulder 162 formed in the valve sleeve central passage, so as to normally hold the valve seat assembly 120 in position with respect to the valve sleeve. However, it will be seen from FIG. 2 that a pressure on the piston cap 154 of sufficient force to overcome the valve bias spring 152 will force the piston cap 154 and therefore the valve plug 124, toward the valve seat assembly 120 so as to close the valve orifice 126. Further piston plug movement, once the valve orifice 126 is closed, will physically displace the valve seat assembly 120 toward the feed adjustment knob 138 by overcoming the bias of the valve seat bias spring 160.

In operation, hydraulic fluid under pressure enters the valve body hydraulic fluid inlet passage 106 and passes through the valve sleeve hydraulic fluid inlet passage 108 into a valve outer chamber 170 formed between the valve central passage and the valve seat. The valve seat has a pair of valve seat inlets 172 to permit the hydraulic fluid to flow through the valve seat assembly from the valve outer chamber 170 into a valve inner chamber 174 formed between the valve seat assembly and the valve piston by a constriction in the piston. It will be noted that the constriction in the piston utilized to form the valve inner chamber widens to form the valve plug 124. As shown, the valve plug 124 is seated in the valve orifice 126 when the feed control lever stop surface 146 contacts the face 144 of the feed adjustment knob 138.

The feed control lever 142 is pivotally attached to the valve piston 122 at a pivot pin 180. The dimension between the respective stop surfaces 146, 148, 150 and the pivot pin 180 is selected so as to provide the coarse control of the rate of flow of hydraulic flow for various valve positions. The feed control lever 142, and the spacing of the stop surfaces 146, 148, 150 with respect to the pivot pin 180, are shown in greater detail in FIG. 6. Thus, when the stop surface 150 engages the feed control face 144, the plug is withdrawn from the orifice a greater distance than when the stop surface 148 engages the face 144. A fine control over the displacement of the valve plug 124 from the valve orifice 126 is provided by the feed adjustment knob 138, which may be rotated to move the face 144 in or out with respect to the valve body 22. Since the valve seat assembly 120 is normally fixed in position with respect to the valve body 22, movement of the face 144 permits the adjustment of the amount by which the valve plug 124 can be withdrawn from the valve orifice 126.

As will be apparent from FIG. 2, the displacement of the valve plug 124 from the valve orifice 126 moves the piston cap 154, together with the valve plug 124, away from the valve orifice 126. In the position shown in FIG. 2, a seal between the valve plug 124 and the valve orifice 126 is formed by an O-ring 182. The O-ring 182 is held in position between the valve cap 154 and the valve piston 122 and, when the valve piston is disposed within the valve orifice, engages the valve orifice periphery so as to form a seal. Withdrawal of the valve plug 124 from the valve orifice 126 removes the seal formed by the O-ring 182 so as to permit the flow of hydraulic fluid through the valve orifice 126 into and through the valve sleeve hydraulic fluid outlet passage 112 and the valve body hydraulic fluid outlet passage 114. Various other O-rings are shown in FIG. 2, but are not specifically designated herein as such, inasmuch as their function is readily apparent.

In FIG. 2, the turret stop assembly 24 is also shown in section. The turret stop assembly includes a bolt or axle 200 which extends into the valve body 22 in threaded engagement at a threaded portion 202 so as to be fixed to the valve body. A turret stop body 204 is mounted on the axle 200 so as to be rotatable thereabout. An indexing lever 206 is mounted on the turret stop body at a ratchet neck portion 208 thereof. The indexing lever is held in contact with the turret stop body by means of a retaining ring 210. The turret stop body is biased away from the valve body by a turret stop body bias spring 212. The turret stop body includes, on the portion remote from the indexing lever, a plurality of turret stops 214 which are attached to the turret stop body by having threaded portions 216 engage complementary threaded portions 218 formed in the turret stop body. The turret stops have heads 220, whose dispositions, with respect to the turret stop body 204, is fixed by means of turret stop lock nuts 222 locking the turret stops against rotation.

A spring-loaded detent 224 extends between the valve body 22 and the turret stop body 204, as is shown more clearly in FIG. 5. The detent prevents inadvertent rotation of the turret stop assembly.

FIG. 3 is a cross-sectional view of the indexing lever, illustrating the ratchet utilized in conjunction with the indexing lever for rotation of the turret stop assembly. As seen in FIG. 3, the indexing lever 206 includes a lever body portion 230 which surrounds the ratchet neck portion 208 and axle 200. The lever body portion 230 is partially cut away in order to provide clearance with the valve body 22 but to limit the amount of rotation of the indexing lever 206 by contact of stop faces 232, 234 of the lever body portion 230 with the valve body 22. The lever body portion 230 has a hollow neck 236, to which a lever extension 238 having a ball knob 240 is connected by a pin 242. Disposed within the hollow neck 236 is a ratchet bias spring 244 which extends between the lever extension 238 and a ratchet pawl 246. The ratchet pawl 246 is held in position by means of a pawl pin 248 so as to be slidable along the axis of the hollow neck 236, but otherwise fixed in position.

The ratchet neck portion 208 is shown in FIG. 3 to have a series of ratchet faces 250 which the ratchet pawl 246 may engage as the indexing lever is rotated clockwise. The ratchet faces 250 permit rotation of the indexing lever 206 with respect to the turret stop body 204. By means of the stop faces 232, 234, a limited clockwise rotation of the indexing lever is possible, so as to move the ratchet pawl 246 past ratchet faces 250 adjacent in clockwise disposition. When the stop face 232 comes in contact with the valve body 22, the indexing lever 206 cannot be rotated further in a clockwise direction. Counterclockwise rotation of the indexing lever then rotates the ratchet neck and so the turret body in a counter-clockwise rotation until the stop face 234 contacts the main valve body 22.

Thus, the turret stop body 204 can be rotated in position to select the particular turret stop 214 which is to contact the rotatable stop 32 (FIG. 1).

Figure 4:
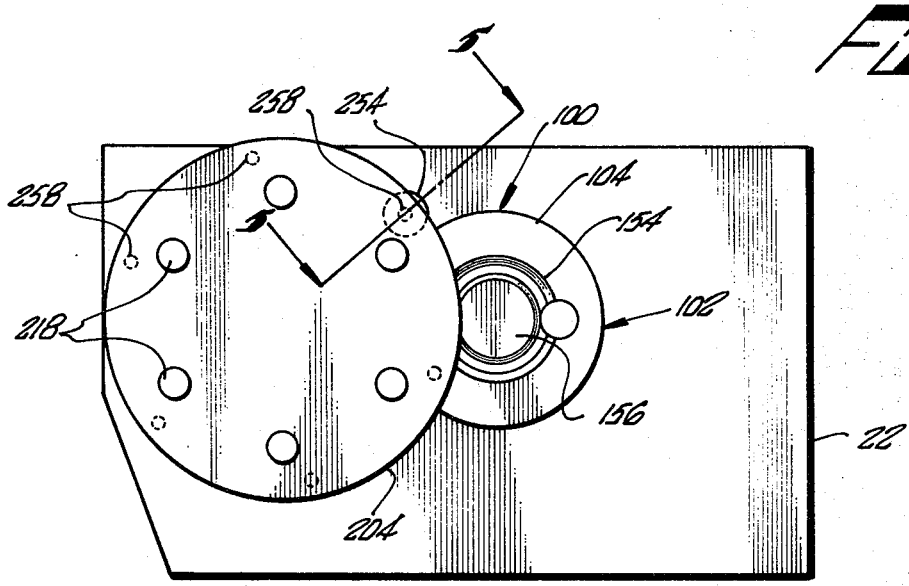
FIG. 4 is a view of the valve body illustrating the relative disposition of the turret stop assembly and control valve.

FIG. 4 is a view of the valve body illustrating the relative disposition of the turret stop body 204 with respect to the control valve 100. As will be apparent from FIG. 4, and also from FIG. 2, the turret stop body 204 overlies a portion of the piston cap 154. Thus, depression of the turret stop body 204, overcoming the turret stop body bias spring 212, will force the piston cap 154, and thus the valve plug 124, toward the valve orifice 126, until the piston plug closes the orifice. When the piston closes the orifice, hydraulic fluid flow is terminated, establishing the limit of relative movement between the base and slide assemblies. Thus, when relative movement between the compound base assembly 12 and the compound slide assembly 14 causes a turret stop 214 to contact one of the rotatable stops 32, further relative movement will cause the closure of the control valve without regard to the setting of the feed control lever 142, and so terminate relative movement between the compound base assembly and compound slide assembly.

FIG. 5 is a fragmentary view of a portion of the turret stop body 204 and valve body 22 illustrating the construction of the spring loaded detent 224 which inhibits rotation of the turret stop body with respect to the valve body. The purpose of the utilization of the detent is to insure that the turret stop body does not inadvertently rotate to present a different turret stop 214 to the rotatable stop 32 than that which is intended. As will be apparent from FIG. 5, a bore 252 is formed in the back face of the valve body 22. The detent 224 is attached to a detent body 254 disposed in the bore 252, and urged outward by a detent bias spring 256. The detent 224 engages a recess 258 formed in the turret body 204, so as to inhibit rotation of the turret stop.

By rotating the indexing lever in a counter-clockwise direction, the ratchet and pawl engagement overcomes the detent mechanism to permit counter-clockwise rotation of the turret body. However, the ratchet mechanism is operable only for unidirectional (counter-clockwise) rotation of the turret body. Clockwise rotation of the turret body, in response to friction resulting from clockwise rotation of the indexing lever, is prevented by detent 224 engagement in the recess 258. The relative disposition of the detent mechanism with respect to the valve body and turret stop will be more apparent with respect to FIG. 4, in which the detent mechanism is shown, in part, by means of dotted lines. FIG. 4 also illustrates the utilization of a recess 258 to correspond to each turret stop 214 so as to provide for the locking of the turret stop body in position, as appropriate, for each turret stop to insure contact between the selected turret stop and the rotatable stop 32. In the preferred embodiment, the rotatable stop 32 may be rotated manually so as to avoid contact with the turret stop, if desired, in order to provide an override of the turret stop assembly function.

The operation of the present invention will now be described with respect to controlling hydraulically operated cutting tools, such as that shown, for example, in U.S. Pat. No. 3,262,370. In devices of the type illustrated in the aforesaid patent, a pattern or template is used to define the shape which the cutting tool will ultimately produce on a piece of stock or blank. In instances where the stock or blank differs significantly from the shape of the template in a lateral direction, necessitating the removal of relatively large quantities of stock material in a lateral direction in order to achieve the desired shape, it is preferable to remove the material by means of a series of passes of the cutting tool, rather than attempting to define the final shape in a single pass.

For such an application, the turret stop assembly 24 is utilized and the turret stops 214 are adjusted in length to provide the desired depths of the successive cuts by the cutting tool. The slidable stop assembly 26 is positioned to give the appropriate first cut depth. The turret assembly is then indexed by means of the indexing lever to dispose the turret stop 214 having the greatest length in position to subsequently contact the rotatable stop 32.

The feed control lever is moved from the valve closure position to one of the valve open positions, opening a passage for control fluid flow into the mechanism utilized to control lateral movement of the cutting tool, for example, the Y-direction control cylinder of the aforesaid patent. Hydraulic fluid flow, resulting from the difference in shape of the pattern and blank at the particular location, then commences through the control valve by reason of the valve plug 124 having been displaced from the valve orifice 126. This hydraulic fluid flow causes the cutting tool to contact the blank, so as to remove material from the blank. Lateral movement of the cutting tool continues until the flow of hydraulic fluid is stopped. Such stoppage may be by reason of the operation of the turret stop assembly, as heretofore described, in contacting the piston cap 154 so as to close the valve. If the cutting tool has removed a sufficient amount of material from the blank to have the physical dimension of the blank correspond to that desired, so as to terminate the pressure differential which initiates the hydraulic fluid flow, lateral motion will also stop. If the turret stop assembly has shut off the hydraulic fluid flow, the cutting tool proceeds along the blank, in the same lateral disposition, until either the end of the blank is reached or until a point on the pattern is reached at which the blank dimension corresponds to that of the pattern. If the end of the blank is reached, the cutting tool is removed from the blank, the turret stop assembly indexed to the necessary position, and the cycle repeated. If the cutting tool reaches a location on the blank corresponding to the proper dimension, the turret stop assembly retracts from the piston cap so as to permit further operation of the machine in conventional manner.

For operation in which the turret stop function is not desired, the rotatable stop 32 is rotated so as to be out of contact with any of the turret stops 214, and the cutting tool then shapes the blank into the configuration indicated by the pattern in one pass.

In utilizing the present invention with different material of construction for the blank, different lateral speeds of movement for the cutting tool will be necessary. In order to provide an infinite adjustment control between the maximum and minimum stop for this speed, the feed adjustment knob 138 is rotated to provide a fine adjustment of the valve opening.

The foregoing description of operation of the valve has assumed that the hydraulic fluid whose flow is to be controlled is applied through the valve body inlet passage 106 and valve sleeve inlet passage 108. In such operation, the position of the valve seat 120 is fixed, neglecting operation of the turret stop assembly, by the second shoulder 162. However, in certain applications, it will be desirable to be able to rapidly reverse the flow of hydraulic fluid in order to return the pattern tracing stylus and the cutting tool to their original positions. The valve assembly of the present invention may be utilized to provide such rapid reversal by utilizing a conventional two-directional valve so as to apply the hydraulic fluid, under pressure, to the valve body outlet passage 114 and valve sleeve outlet passage 112. The valve seat 120, being spring-loaded, will be moved away from the second shoulder 162 by the greater pressure existing in the outlet passages 112, 114 with respect to the inlet passages 106, 108. The valve will thus be opened and hydraulic fluid may pass in the reversed direction, so as to move the hydraulically controlled member to its original position, so as to re-position the entire apparatus.

In addition, the direction in which the entire apparatus is moved, relative to movement of the tracing stylus or the like, can be reversed by using a two-directional valve which applies the hydraulic fluid flow, generated in the normal manner through the control valve assembly, to the opposite end of the hydraulically powered member from that heretofore utilized. Such outward movement will produce a tracing or cutting in the opposite direction. Thus, it is to be understood that the invention, in its broadest aspect, combines the utilization of either or both of the aforementioned flow reveral valves to provide rapid return by hydraulic fluid dumping and to provide reverse seeking or tracing.

The invention claimed is:
1. In a control assembly, the combination of:
   a valve body having a main bore extending therethrough, a hydraulic fluid inlet bore opening into said main bore, and a hydraulic fluid outlet bore opening into said main bore;
   a valve sleeve disposed in the main bore, said valve sleeve having a central passage, a fluid inlet passage aligned with the fluid inlet bore of the valve body, and a fluid outlet passage aligned with the fluid outlet bore of the valve body;
   a valve seat in the valve sleeve central passage disposed between the inlet passage and the outlet passage and having a valve orifice formed therein, said valve sleeve having a shoulder formed in its central pas- sage, against which the valve seat is normally positioned, and including bias means urging the valve seat against said shoulder;

a valve piston disposed within the valve sleeve central passage and having a valve plug disposed in alignment with the valve orifice;

means connecting the valve piston to the valve sleeve to provide limited relative movement between the valve piston and the valve sleeve, including:
  (a) means connected between the valve piston and valve sleeve for normally biasing the valve plug and the valve seat apart so as to open the valve formed thereby;
  (b) valve actuator means connected between the valve piston and the valve sleeve and operable when actuated to overcome the normal bias so as to close the valve by moving the valve plug into the valve seat;

means, connected to the valve piston, for forming a seal about the valve orifice when the valve plug is disposed therein;

an axle attached to the valve body;

a turret stop body rotatably mounted on the axle;

an indexing lever rotatably mounted on the turret stop body;

ratchet means connected between the indexing lever and the turret stop body and adapted for unidirectional rotation of the turret stop body;

detent means connected between the valve body and the turret stop body for inhibiting turret stop body rotation;

a plurality of turret stops disposed on the turret stop body in a circuit whose center is the axis of said axle;

means for normally urging the turret stop body away from the valve body;

a compound slide assembly to which the valve body is fixed;

a compound base assembly to which the compound slide assembly is connected so as to permit relative movement therebetween;

stop means attached to the base assembly and disposed so as to be selectively engageable with preselected ones of said turret stops to move the turret stop body toward the valve body; and means connected to the valve piston and engageable with the turret body upon turret body movement toward the valve body to move the valve plug into the valve orifice.

2. The combination of claim 1, and including means to vary the limit of relative movement between the valve piston and valve sleeve.

References Cited

UNITED STATES PATENTS

| 3,107,581 | 10/1963 | Ackerman | 82—21 |
| 3,207,472 | 9/1965 | Seltsam | 251—263 |
| 3,419,246 | 12/1968 | Burgess | 251—263 |

GERALD A. DOST, Primary Examiner

U.S. Cl. X.R.

82—21; 251—263